United States Patent
Wood et al.

(10) Patent No.: US 12,026,306 B2
(45) Date of Patent: Jul. 2, 2024

(54) SYSTEMS AND METHODS FOR DISPLAYING INFORMATION ON A DRIVER'S DISPLAY

(71) Applicant: Rivian IP Holdings, LLC, Plymouth, MI (US)

(72) Inventors: Eric Ross Baker Wood, Menlo Park, CA (US); Nicholas Robert Kalayjian, San Carlos, CA (US)

(73) Assignee: Rivian IP Holdings, LLC, Plymouth, MI (US)

(*) Notice: Subject to any disclaimer, the term of this patent is extended or adjusted under 35 U.S.C. 154(b) by 0 days.

(21) Appl. No.: 17/876,208

(22) Filed: Jul. 28, 2022

(65) Prior Publication Data
US 2024/0036642 A1   Feb. 1, 2024

(51) Int. Cl.
*G06F 3/01*    (2006.01)
*B60K 35/00*   (2024.01)
*B60K 35/22*   (2024.01)
*G06T 7/73*    (2017.01)
*G09G 3/20*    (2006.01)

(52) U.S. Cl.
CPC ............ *G06F 3/013* (2013.01); *B60K 35/00* (2013.01); *G06F 3/012* (2013.01); *G06T 7/73* (2017.01); *G09G 3/20* (2013.01); *B60K 35/22* (2024.01); *B60K 2360/21* (2024.01); *G06T 2207/30201* (2013.01); *G06T 2207/30268* (2013.01); *G09G 2320/0613* (2013.01); *G09G 2340/0464* (2013.01); *G09G 2340/14* (2013.01); *G09G 2354/00* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 9,469,195 | B1* | 10/2016 | Boss | B60K 37/02 |
| 10,510,276 | B1* | 12/2019 | Lee | G09G 3/001 |
| 2002/0067366 | A1* | 6/2002 | Hirao | B60K 35/00 |
| | | | | 345/660 |
| 2015/0084764 | A1* | 3/2015 | Wunsche | B60R 1/12 |
| | | | | 340/462 |
| 2015/0310287 | A1* | 10/2015 | Tseng | G06F 3/013 |
| | | | | 382/104 |
| 2017/0050542 | A1* | 2/2017 | Shigeta | B60N 2/16 |
| 2020/0348751 | A1* | 11/2020 | Beineke | G06F 3/1423 |
| 2022/0066551 | A1* | 3/2022 | Taniguchi | G06V 40/176 |

* cited by examiner

*Primary Examiner* — Christopher R Lamb
(74) *Attorney, Agent, or Firm* — Haley Guiliano LLP (57) ABSTRACT

Systems and methods for adjusting a display in a vehicle are provided. The display is configured to present information in one or more regions of the display. The position of a user in the vehicle is detected and based on detecting a change in position of the user, the position of information on the display may be adjusted. For example, when the change in position of the user causes information on the display to be obstructed, the position of the information may be adjusted to an unobstructed region of the display.

20 Claims, 8 Drawing Sheets

SYSTEMS AND METHODS FOR DISPLAYING INFORMATION ON A DRIVER'S DISPLAY

INTRODUCTION

The present disclosure is directed to displaying information on a display and, more particularly to reducing obstruction of displayed information.

SUMMARY

The present disclosure is directed to improved driver display systems of a vehicle. In some embodiments, systems and methods are provided for controlling the placement of information on a driver's display to reduce obstruction of the information by, for example, a steering wheel.

A driver's display may be positioned behind the steering wheel of the vehicle. The display may serve to provide the driver with important information in a position that is available with only a quick glance away from the road. The entire driver's display, however, may not be visible to the driver due to the steering wheel blocking a portion of it. While important information may be displayed in a position that is not likely to be obstructed, there are limitations. For example, there are limits in the size of the display to include all of the information in unobstructed positions. Further, what is visible to a driver changes with the position of the driver and the position of the steering wheel. As a result, at times important information may not be visible to a driver without the driver repositioning his or her position, which takes time away from watching the road. Consequently, the systems and methods of the present disclosure position information on a display tailored to, for example, a current position of a user. In some embodiments, for example, a driver's position and the steering wheel's position are determined, and information is displayed in positions that are determined to be visible to the driver.

In accordance with the present disclosure, systems and methods are provided that display information in a visible position on a driver's display. A vehicle may include a display, such as an LCD display, positioned behind a steering wheel. The display may be comprised of pixels such that rearranging letters, numbers, and figures is possible. The display may be controlled by processing circuitry of the vehicle based on information received from a camera or a computer vision algorithm which processes information from a camera. The processing circuitry may also take into account the position of the seat of the driver and the position of the steering wheel.

In some embodiments, the display may be controlled by processing circuitry of the vehicle based on input informing the processing circuitry of the position of the driver's eyes and the position of the steering wheel. For example, in some embodiments, the system may include a camera to capture an image of the user and a computer vision algorithm to determine the position of the user within the vehicle. In some embodiments, the computer vision algorithm may identify the location of the eyes of the driver and determine their position within the vehicle. In some embodiments, the steering wheel may be digitally controlled and report its position to the processing circuitry. In some embodiments, based on this information, the processing circuitry may calculate the line of sight of the driver and determine whether the driver is able to view a specific portion of the display containing information.

In some embodiments, if the processing circuitry determines that a driver cannot view a portion of the display containing information, it may move that information to a portion of the display that is visible to the driver.

In some embodiments, the processing circuitry automatically rearranges information on the driver's display to be visible by the driver's eyes. In some embodiments, the processing circuitry continually recalculates visibility. For example, the processing circuitry may initially display the speed of the vehicle in the center right side of the driver's display. A driver may adjust the position of the steering wheel, by lowering or raising the steering wheel, in a way that obstructs the view of the speed on the display. The system may determine, based on the position of the driver and the steering wheel, that the driver cannot see the speed. The system may then reposition the speed on the display (e.g., upward or downward) to be out of the sightline of the steering wheel and in clear view of the user.

In some embodiments, the driver may select information he or she wishes to prioritize for viewing. For example, if the driver has indicated that the speed of the vehicle is more important than the weather, the processing circuitry may not reposition the speed of the vehicle in favor of ensuring that the weather is visible. In some embodiments, the driver may select what information he or she would like displayed on the driver's display. For example, a driver may select radio volume, vehicle range, and battery efficiency on the display while another driver may select only turn by turn directions to be displayed.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

DETAILED DESCRIPTION

Figure 2A:
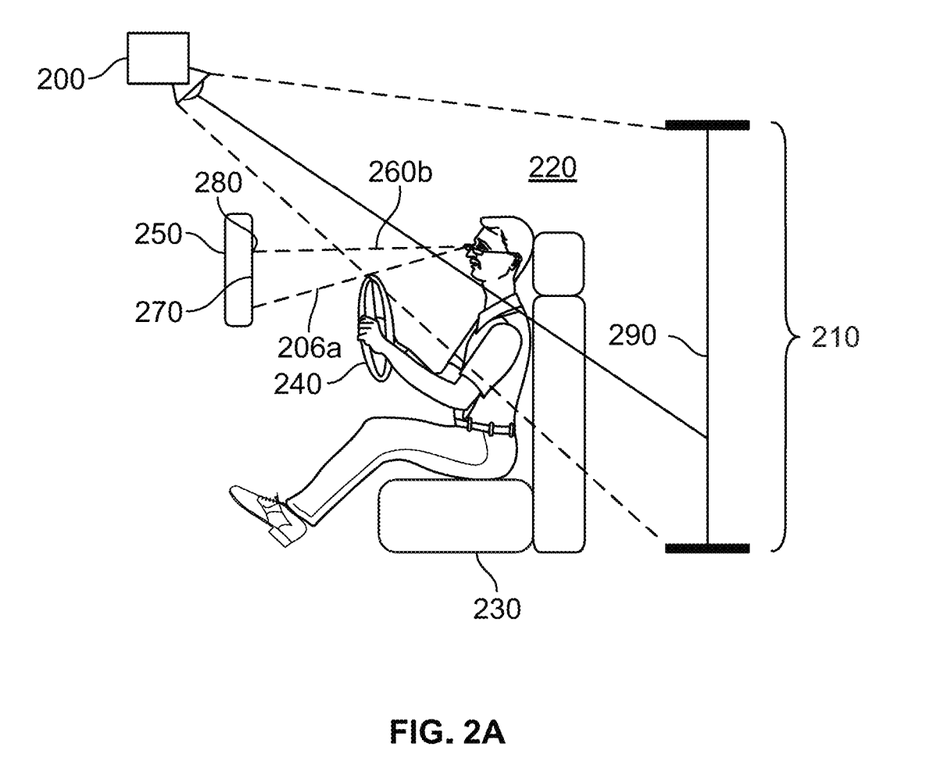
FIG. 2A shows a side view of a driver in a first position in a vehicle with a display system, in accordance with some embodiments of the present disclosure.

The present disclosure is directed to methods and systems for a display (e.g., a driver display) of a vehicle. The system may be implemented, for example, using a vehicle display as shown in FIG. 2A in accordance with some embodiments of the present disclosure.

In some embodiments, the vehicle includes a driver seat (e.g., seat 230 in FIG. 2) in which the driver (e.g., driver 220 in FIG. 2) sits while operating the vehicle. The seat may be positioned to allow the driver to see the road. In some embodiments, the driver may position the seat to best position the driver for comfort and visibility. In some embodiments, the seat may be digitally controlled.

In some embodiments, the vehicle also includes a steering wheel (e.g., steering wheel 240 in FIG. 2) positioned in front of the driver seat. The driver may use the steering wheel to indicate the desired direction of the vehicle. The steering wheel may be circular, although other shapes may be used as well.

In some embodiments, the driver rotates the steering wheel to communicate direction to the vehicle. In some embodiments that do not use a circular steering wheel, this rotation will change the space the steering wheel occupies. In some embodiments, the driver can adjust the position of the steering wheel. For example, the driver may adjust the steering wheel up or down to better accommodate his or her hand position. In another example, the driver may adjust the steering wheel closer or farther away from the driver.

In some embodiments, the display system includes a digital or other display (e.g., display 250 in FIG. 2) positioned behind the steering wheel. In some embodiments, a digital display is comprised of pixels which when activated together form an image or message. The location of the display behind the steering wheel allows the driver to view important information, such as speed, distance, or directions, while driving without having to look far from his or her view of the road. A driver may see information such as speed simply by glancing down from the road and immediately returning his or her gaze to the road. However, due to the position of the steering wheel between the driver and the display, the steering wheel may block portions of display to the driver. In some embodiments, processing circuitry may locate the position of a driver's eyes and the position of the steering wheel within the vehicle and calculate the driver's line of sight to the display to determine if the steering wheel obstructs the drivers' view of information presented on the display. In some embodiments, the processing circuitry adjusts the position of information on the display to ensure that information is in the driver's 220 view.

Figure 1:
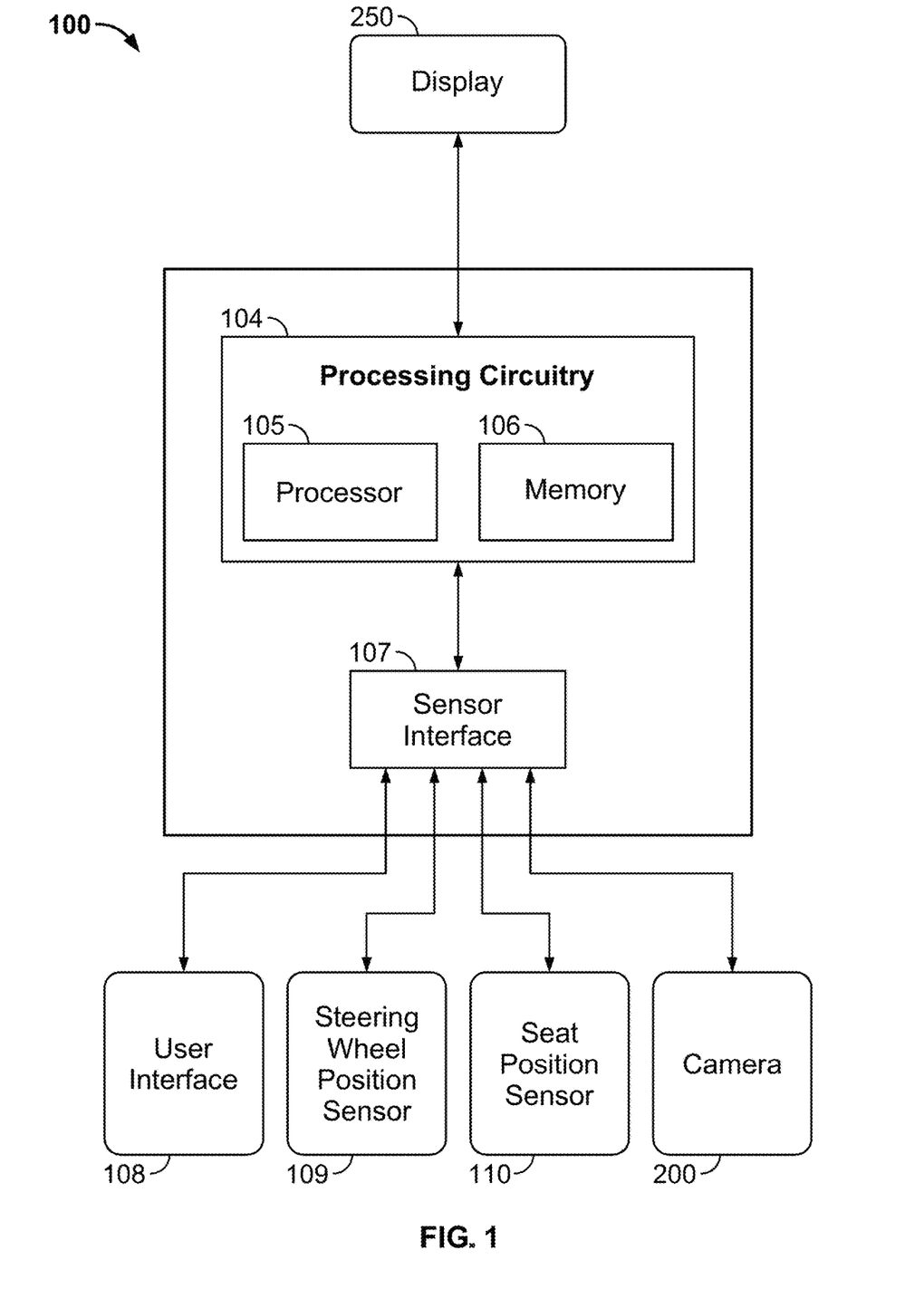
FIG. 1 shows a block diagram of components of a display system of a vehicle, in accordance with some embodiments of the present disclosure.

FIG. 1 shows a block diagram of components of a display system 100 of a vehicle, in accordance with some embodiments of the present disclosure. In some embodiments, the display system may include processor 105. Processor 105 may comprise a hardware CPU for executing commands stored in memory 106 or software modules, or a combination thereof. In some embodiments, processor 105 and memory 106, in combination, may be referred to as processing circuitry 104. In some embodiments, processor 105 alone may be referred to as processing circuitry 104.

In some embodiments, display system 100 may include memory 106. In some embodiments, memory 106 may include hardware elements for non-transitory storage of commands or instructions, that, when executed by processor 105, cause processor 105 to operate display system 100 in accordance with embodiments described above and below. For example, memory 106 may be a non-transitory computer-readable medium.

In some embodiments, processor 105 may be communicatively connected (e.g., via a sensor interface 107) to camera 200. In some embodiments, camera 200 may be controlled via directions from processing circuitry 104. In some embodiments, information from camera 200 may be processed by a computer vision algorithm (e.g., implemented using processing circuitry 104).

In some embodiments, processor 105 may be coupled to display 250 (e.g., an LCD display). The display 250 may be used to present information elements to a driver 220. For example, processing circuitry 104 may use information received from camera 200, steering wheel position sensor 109, and seat position sensor 110 to determine whether or not to adjust or move an information element on display 250.

In some embodiments, processing circuitry 104 is further communicatively connected to a user interface 108, for example via sensor interface 107. Processing circuitry 104 may receive instructions from driver 220 from user interface 108. In some embodiments, processing circuitry 104 is further communicatively connected to a steering wheel position sensor 109, for example via sensor interface 107. Processing circuitry may receive information regarding the position of the steering wheel from steering wheel position sensor 109. In some embodiments, processing circuitry 104 is further communicatively connected to a seat position sensor 110, for example via sensor interface 107. Processing circuitry 104 may receive information regarding the position of the seat from seat position sensor 110 (e.g., seat bottom height, seat bottom position fore and aft in the vehicle, and/or recline angle of the seatback).

FIG. 2A shows a side view of a driver 220 in a vehicle with display system 100 of FIG. 1 in accordance with some embodiments of the present disclosure. Driver 220 is sitting in seat 230. In front of driver 220 is steering wheel 240. The driver's eyes are shown focusing on display 250 via sightlines 260a and 260b. As illustrated in FIG. 2A, steering wheel 240 is within sightlines 260a and 260b to the display 250. Steering wheel 240 therefore obstructs driver 220's view of display 250. For example, position 270, which is a position on display 250 corresponding to sightline 260a, is behind steering wheel 240 and is not visible to driver 220. Steering wheel 240 however does not interrupt sightline 260b, which means that sightline 260b to display 250 is clear and position 280 on display 250 is unobstructed and visible to driver 220. In some embodiments, a vehicle includes one or more internal cameras 200 capable of capturing images of the driver 220 or other passengers. In some embodiments, a computer vision algorithm processes the images of the camera 200. In some embodiments, the computer vision algorithm recognizes and identifies the position of a driver 220 or specific body parts (e.g., a facial feature such as the eyes) of driver 220 within the vehicle. For example, the computer vision algorithm may recognize the face of driver 220. Camera 200 may capture a two-dimensional image of the interior of the vehicle spanning a height and width, the height of the image being represented by line 210. In FIG. 2A, the driver 220 is in view of camera 200, further illustrated by the fact that the driver 220 is within the height represented by line 210. The camera 200 captures the eyes of driver 220 within the image as well. Objects in the image have corresponding widths and heights which correspond to regions of the image. For example, driver 220's eyes correspond to vertical point 290, as seen in FIG. 2A. The system may use information from the captured image to determine the position of driver 220's eye or eyes to position information on display 250 (e.g., in an unobstructed sightline of driver 220).

Figure 2B:
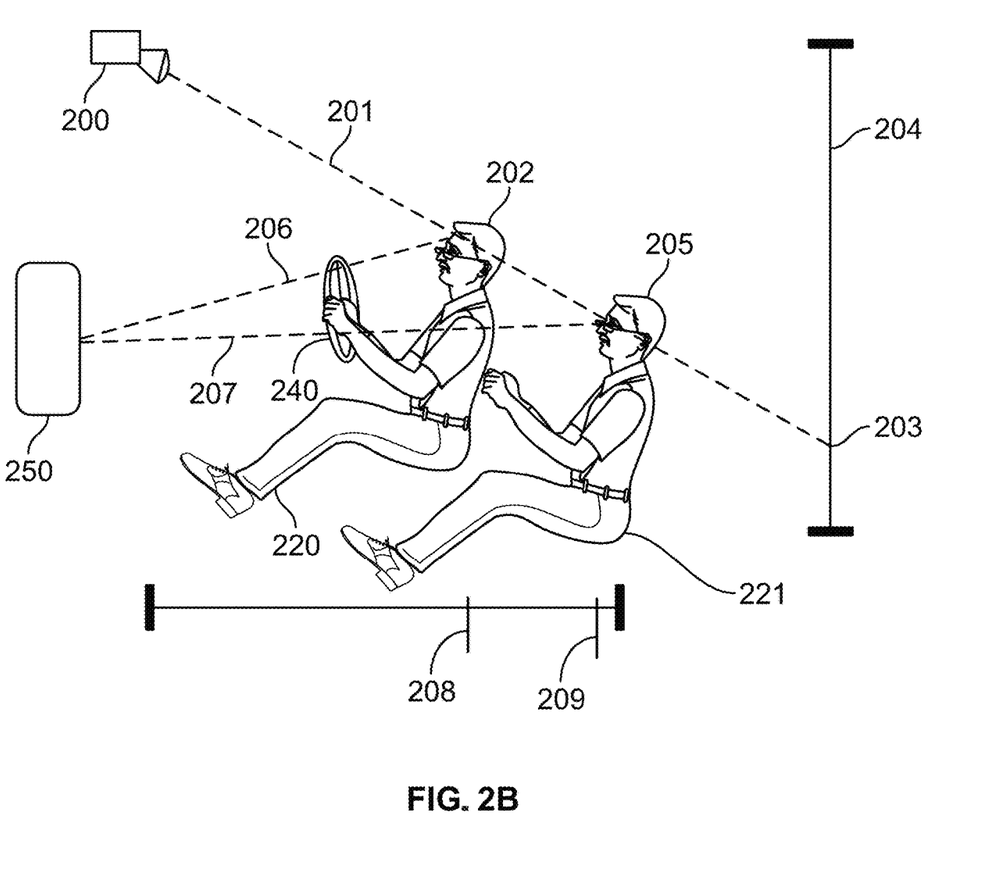
FIG. 2B shows an illustration of drivers of different sizes and positions captured by a camera, in accordance with some embodiments of the present disclosure.

FIG. 2B shows an illustration of drivers 220, 221 of different sizes and positions captured by a camera 200, in accordance with some embodiments of the present disclosure. In some embodiments, the position of driver 220 in camera 200 will depend on his or her distance from camera 200. It should be noted that the image captured by camera 200 may be a two-dimensional image of a matrix of pixels, having height and width, while the driver 220 exists in three-dimensional space having height, width, and depth. In some circumstances, objects of different dimensions and positions may be represented identically in the captured image due to the image's two-dimensional capture of three-dimensional space, as illustrated in FIG. 2B. The captured image represents light, e.g., diagonal line 201, received at the lens of camera 200, where light from different directions is represented by different pixels in the captured image. When two objects are in the same line of sight, they will be represented by the same pixel or pixels in the captured image. However, the position of this pixel may not represent a single horizontal (or vertical) position in three-dimensional space. The system may take into account the depth of the object to inform the system of the position of the object in three-dimensional space. For example, as indicated in FIG. 2B object 202, in this example the eye of a driver 220, is captured along line direction line 201 and is represented by point 203 in the vertical component of captured image 204. Object 205, in this example the eye of a second driver 221, is also captured along light direction 201 and is also represented by point 203 in the vertical component of captured image 204 despite being lower than object 202 in three-dimensional space. It should be noted that while the objects 202 and 205 are in the same line of sight, relative to camera 200, the lines of sight to display 250 for the two objects are not identical as shown by sight line 206 from the center of display 250 to driver 220, and sight line 207, from the center of display 250 to driver 221. Sight line 207 is intersected by steering wheel 240, indicating that driver 221's view of display 250 will be obstructed by steering wheel 240, while sight line 206 is clear of obstructions. The difference in sight lines and views illustrates the importance of correctly and accurately determining a driver 220,221's position. In some embodiments, the depth of driver 220 is used to determine his or her position in three-dimensional space. In some embodiments, the system may rely on seat positions 208 and 209 to determine the position of objects and ultimately regions on display 250 visible to those objects. The system may calculate the horizontal (and/or vertical) positions of objects 202 and 205 in an image, and their corresponding positions in space, as a function of seat position 208, 209 and image point 203. In some embodiments, display system 100 may only estimate the depth of driver 220, 221 based on seat position 208, 209. For example, the system may estimate the driver 220, 221's depth relative to the seat position 208, 209. Once the depth of driver 220, 221 is determined, the system may include this measurement to determine the three-dimensional position of driver 220, 221 or the eyes of driver 220, 221, which in turn is used to calculate visible regions on the display 250. The system may incorporate depth in its calculation of position using principles of geometry, a look up table, or other applicable means. While FIG. 2B illustrates finding positions on the vertical axis, the same principles can be applied in the horizontal axis as well.

Figure 3A:
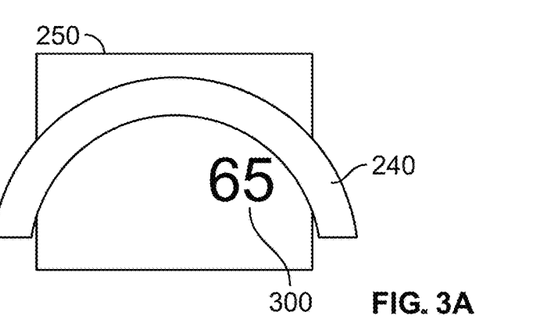
FIG. 3A shows an illustrative view of a display behind a steering wheel, in accordance with some embodiments of the present disclosure.

FIG. 3A shows an illustrative view of a view of a display 250 behind steering wheel 240 in accordance with some embodiments of the present disclosure. Display 250 presents information elements or pieces of information relevant to the driver, such as information element 300, which shows the speed of the vehicle. The information elements may include, for example, the speed of the vehicle, vehicle range, battery efficiency, directions, radio volume, malfunctioning notices, time, and weather, among others. In some embodiments, information elements may be a combination of letters, numbers, symbols, or pictures. For example, in the case where an information element displays the speed of the vehicle, the information element may include a number to indicate the speed, such as 65 for 65 miles per hour, and letters to indicate the unit, such as MPH to indicate miles per hour rather than kilometers per hour or another unit. On the other hand, an information element indicating low battery may be symbol such as a flashing picture of a battery. In another example, the information element may be driving directions and may take the form of an image of the road with arrows indicating an upcoming turn. In some embodiments, display 250 may present more than one information element 300 at a given time. For example, display 250 may present speed in the center right of display 250, directions in the center of display 250, weather in the top right, and gear position in the bottom left. In some embodiments, the position of the information elements on display 250 may be adjustable. A driver, other user, or a manufacturer of the vehicle may determine what information display 250 shows and where each information element 300 is positioned on display 250. In some embodiments, the display system 100 includes a user interface 108 in which the driver may select which information he or she would like display 250 to include and where the selected information elements will go. In some embodiments, the user interface 108 may be a touch screen.

In some embodiments, display 250 may present the speed of the vehicle as represented by information element 300 in FIG. 3A. In some embodiments, display 250 may position information element 300 in the center right as shown in FIG. 3A.

In some embodiments, the display system 100 may include processing circuitry 104 that is capable of interfacing with data collected from camera 200 or a computer vision algorithm, steering wheel 240, and display 250. In some embodiments, processing circuitry 104 is capable of positioning the information elements on display 250. In some embodiments, processing circuitry 104 may determine the position of the driver's eyes using information received from camera 200 or the computer vision algorithm. For example, processing circuitry 104 may receive the position of the eyes from the computer vision algorithm. In another example, processing circuitry 104 may estimate the position of the eyes based on a known position of the driver 220 or the driver's 220 head. In some embodiments, processing circuitry 104 may also receive data regarding the position of the steering wheel 240. In some embodiments, processing circuitry 104 may determine if an information element such as information element 300 is visible to a driver. For example, processing circuitry 104 may take into account the position of the driver's eyes relative to display 250, as well as the position of steering wheel 240, to determine if steering wheel 240 obstructs the driver's view of information element 300 on display 250. In some embodiments, processing circuitry 104 may determine which portions of display 250 are visible and not visible to the driver.

In some embodiments, processing circuitry 104 may determine or adjust the position of one or specific information elements on display 250. For example, processing circuitry 104 may adjust the position of information element 300 if it determines that information element 300 is not visible to the driver. In some embodiments, processing circuitry 104 moves an obstructed information element 300 to a position on display 250 it has determined is visible to the driver. Processing circuitry 104 may perform this action by, for example, altering the output of the specific pixels representing the relevant positions on display 250.

Camera 200 is positioned to capture an image of the driver. Camera 200 may be installed on the ceiling of the vehicle in front of the driver, or anywhere where camera 200 has a clear view of the driver. Camera 200 may, for example, capture an image of the face of the driver. In some embodiments, a computer vision algorithm may process the image camera 200 captured. For example, the computer vision algorithm may locate driver 220 or the driver's eyes in the captured image. Processing circuitry 104 may then calculate the position of the driver's eyes in the vehicle. In some embodiments, processing circuitry 104 may further receive or calculate the position of steering wheel 240 based on manufacturer data or data collected from a steering wheel position sensor 109. In some embodiments, processing circuitry 104 may use the determined position of the driver's 220 eyes, the position of display 250, and the position of steering wheel 240 to determine whether steering wheel 240 blocks the driver's line of sight to one or more information elements on display 250. In some embodiments, when processing circuitry 104 determines that the driver's line of sight to a specific information element is blocked, processing circuitry 104 will reposition the information element on display 250 to a position from which the line of sight is not blocked. For example, if display 250 positions information element 300 containing the speed of the vehicle in the top right corner of display 250 and processing circuitry 104 determines that steering wheel 240 obstructs the driver's line of sight to the top right corner while the bottom right corner is not obstructed, processing circuitry 104 may move information element 300 containing the speed of the vehicle to the bottom right corner of display 250.

In some embodiments, processing circuitry 104 may receive information regarding the position of the driver's seat 230. The driver may position seat 230 to best fit his or her comfort and reach. In some embodiments, processing circuitry 104 may use information regarding the position of seat 230 to determine the position of the driver 220. In some embodiments, the processing circuitry 104 uses this information together with data received from the computer vision algorithm. For example, processing circuitry 104 may determine the distance of the driver's eyes from display 250 based on the distance of seat 230 from display 250 and determine the horizontal and vertical position of the driver's eyes based on the distance of the driver's eyes and the X, Y pixel location of the driver's eyes from, for example, the computer vision algorithm.

In some embodiments, display system 100 further includes a user interface 108 in the form of a touch screen or other interface. In some embodiments, the driver may select preferred information elements to be displayed. In some embodiments, the driver may select preferred placement for information elements. For example, the driver may select or arrange a hierarchy of information elements to be displayed.

Processing circuitry 104 may take into account a hierarchy when deciding placement of information elements. For example, the driver 220 may instruct display system 100 of the hierarchy. Information elements higher in the hierarchy will take priority in positioning. For example, a driver may choose to prioritize a view of directions over a view of the weather. In this situation, processing circuitry 104 will not relocate an obstructed weather information element in place of a direction information element, however processing circuitry 104 may replace the weather information element with an obstructed direction information element.

In some embodiments, processing circuitry 104 may distinguish between fully obstructed and partially obstructed information elements. In some embodiments, processing circuitry 104 will consider an information element with any portion obstructed to be fully obstructed. In some embodiments, processing circuitry 104 will require a given percentage (e.g., 10%, 20%, 30%, 40%, 50%, etc.) of the information element to be obstructed to move the information element. In yet other embodiments, processing circuitry 104 may only consider an information element obstructed if a key portion is obstructed. For example, processing circuitry 104 may allow speed information element 300 to remain in its position if the unit (i.e., "MPH") is obstructed, but will reposition it when the number component of information element 300 (i.e., "65") is obstructed.

Figure 3B:
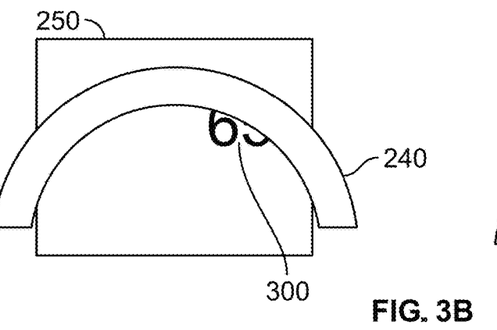
FIG. 3B shows an alternative view of a display behind a steering wheel, in accordance with some embodiments of the present disclosure.

FIG. 3B shows an alternative view of display 250 of FIG. 3A behind steering wheel 240 in accordance with some embodiments of the present disclosure. FIG. 3B represents display 250 of FIG. 3A after the driver has moved upward, either by changing his or her posture or by changing the position of his or her seat 230. The upward movement of the driver has changed the driver's view of information element 300, moving information element 300 downward relative to steering wheel 240. The view of information element 300 is now obstructed by steering wheel 240 in the driver's new position.

Figure 3C:
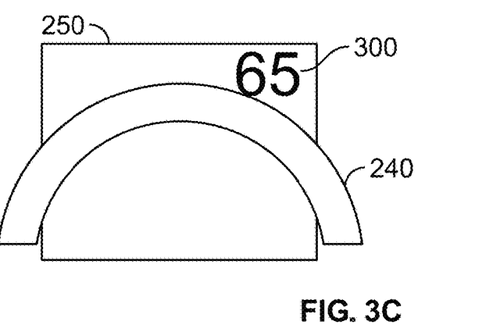
FIG. 3C shows an illustrative view of a display after the position of an information element has been adjusted, in accordance with some embodiments of the present disclosure.

FIG. 3C shows an illustrative view of display 250 of FIG. 3B after the position of information element 300 has been adjusted in accordance with some embodiments of the present disclosure. For example, processing circuitry 104 can detect the change in position of the driver causing information element 300 of FIG. 3B to be obstructed by steering wheel 240. In response, processing circuitry 104 may adjust the position of information element 300 of FIG. 3B upward to compensate for the new view of the driver. As illustrated in FIG. 3C, information element 300, after being adjusted, is now visible. For example, processing circuitry 104 may first determine that the upward position on display 250 is unobstructed for the driver before repositioning information element 300 to the upward position.

Figure 3D:
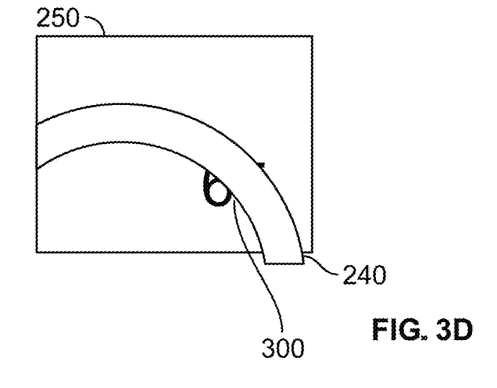
FIG. 3D shows an alternate view of a display behind a steering wheel, in accordance with some embodiments of the present disclosure.

FIG. 3D shows an alternate view of display 250 of FIG. 3A behind steering wheel 240 in accordance with some embodiments of the present disclosure. FIG. 3D represents display 250 of FIG. 3A after the driver has moved to the right by changing his or her position relative to his or her seat 230. For example, the driver may move to the right by leaning or shifting to that side. The rightward movement of the driver has changed the driver's view of information element 300, moving information element 300 to the right relative to steering wheel 240. The view of information element 300 is now obstructed by steering wheel 240 in the driver's new position.

Figure 3E:
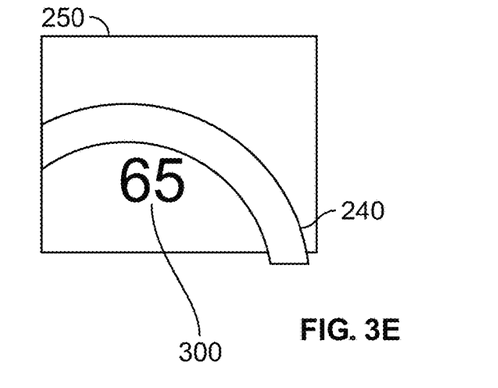
FIG. 3E shows an illustrative view of a display after the position of an information element has been adjusted, in accordance with some embodiments of the present disclosure.

FIG. 3E shows an illustrative view of display 250 of FIG. 3D after the position of information element 300 has been adjusted in accordance with some embodiments of the present disclosure. For example, processing circuitry 104 can detect the change in position of the driver causing information element 300 of FIG. 3D to be obstructed by steering wheel 240. In response, processing circuitry 104 may adjust the position of information element 300 of FIG. 3D to the left to compensate for the new view of the driver. As illustrated in FIG. 3E, information element 300, after being adjusted, is now visible. For example, processing circuitry 104 may first determine that the leftward position on display 250 is unobstructed for the driver before repositioning information element 300 to leftward position.

As illustrated by FIGS. 3A-E, a change in position of a driver in a first direction (e.g., a first lateral or vertical direction) may result in an adjustment to the position of the obstructed information element in a second direction opposite the first direction.

Figure 4:
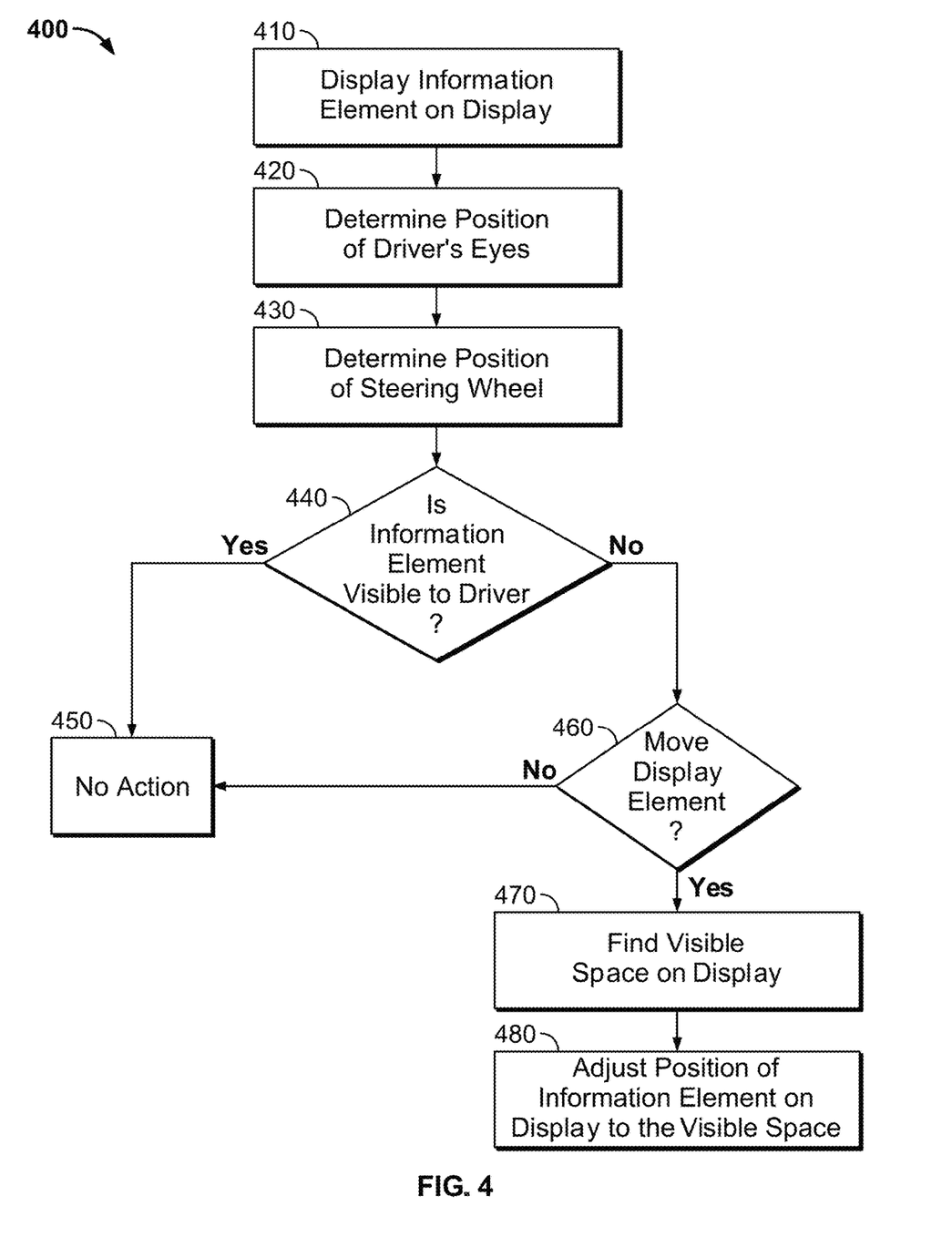
FIG. 4 shows a flowchart for a process for controlling a display system, in accordance with some embodiments of the present disclosure.

FIG. 4 is an illustrative flowchart of a process 400 for controlling a display system (e.g., system 100 of FIG. 1), in accordance with some embodiments of the disclosure. Process 400 may be executed by processing circuitry 104 (e.g., by processor 105 of FIG. 1). That is, processing circuitry 104 may be configured to perform process 400.

At 410, processing circuitry 104 may display at least one information element (e.g., information element 300) on a display. The information element(s) may include information related to the vehicle such as, for example, the speed of the vehicle, vehicle range, battery efficiency, drive mode, gear position, directions, radio volume, malfunctioning notices, time, and weather, among others. The information element may present the information in the form of letters, numbers, symbols, graphics, or a combination thereof.

At 420, processing circuitry 104 may determine the position of the driver's eyes (e.g., through information received from the camera 200, a computer vision algorithm, and/or the position of seat 230). The driver's eyes may be estimated (e.g., based on determined head location) or specifically located. For example, processing circuitry 104 may estimate the position of the eyes of driver 220 of FIG. 2A based on seat 230 position of driver 220 or an image of driver 220's body. In some embodiments, processing circuitry 104 uses a computer vision algorithm to find the actual location of the eyes.

At 430, processing circuitry 104 may determine the position of steering wheel 240 within the vehicle. Processing circuitry 104 may consider the size and shape of steering wheel 240 as well as its position. In some embodiments, steering wheel 240 is digitally controlled (e.g., using an electric motor having an encoder) and this digital control information may be communicated to processing circuitry 104 to inform it of the position of steering wheel 240.

At 440, processing circuitry 104 may determine, based on the position of the driver's eyes and steering wheel 240, whether an information element, such as information element 300, is visible to driver 220. For example, processing circuitry 104 may determine whether or not there is an uninterrupted line of sight between the driver's eyes and display 250 or the information element. Process 400 will continue to step 450 if it determines the information element 300 is visible to the driver. Process 400 will continue to step 460 if it determines that the information element 300 is not visible to the driver.

At 450, processing circuitry 104 may perform no action if it determines that the display element is visible to the driver at step 440.

At 460, processing circuitry 104 may determine whether to move the information element. For example, display system 100 may include a hierarchy of information elements instructing processing circuitry 104 to move a top number of information elements when they are not visible to the driver and to take no action on the remaining information elements. In some embodiments, the system may have instructions not to remove an information element under any circumstances, for example if the position of the information on display 250 is regulated by government standards. If processing circuitry 104 determines that it should not move the information element, process 400 proceeds to step 450 and no action is taken. If processing circuitry 104 determines that it should move the information element, process 400 proceeds to step 470.

At 470, processing circuitry 104 may determine a position on display 250 that is visible to the driver (e.g., unobstructed). The determination may be made using, for example, the position of the driver's eyes and the position of steering wheel 240. Once the processing circuitry 104 has determined a visible position on display 250, process 400 moves to step 480.

At 480, processing circuitry 104 may adjust the position of the information element on display 250 to the space that is visible to the driver. In some embodiments, the visible space may not include any other information and the information element is moved there without any other adjustment. In other embodiments, the visible space may include a second information element, which in turn is moved or removed in favor of the first information element.

Figure 5:
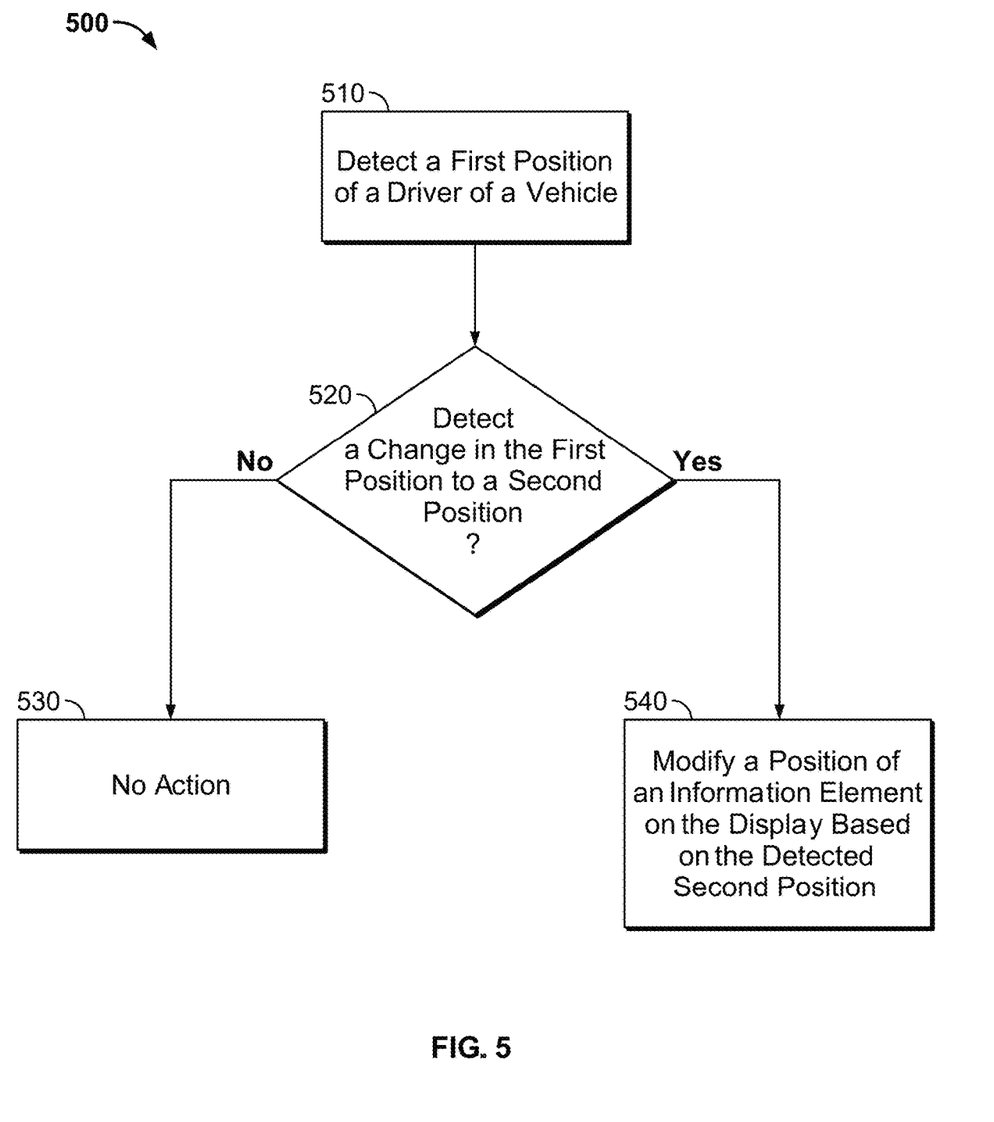
FIG. 5 shows a flowchart for a process for controlling a display system, in accordance with some embodiments of the present disclosure.

FIG. 5 is an illustrative flowchart of a process 500 for controlling a display system (e.g., system of FIG. 1), in accordance with some embodiments of the disclosure. Process 500 may be executed by processing circuitry 104 (e.g., by processor 105 of FIG. 1). That is, processing circuitry 104 may be configured to perform process 500.

At 510, processing circuitry 104 may detect a first position of a driver of the vehicle (e.g., driver 220 of FIG. 2A). In some embodiments, the detection may be based on information received from camera 200, computer vision software as described above, and/or a position of a seat such as seat 230.

At 520, processing circuitry 104 may detect a change in the position of driver 220 from a first position to a second position. In some embodiments, the change is detected based on information received from camera 200, computer vision software, and/or a position of a seat as described above. A change in position may be detected, for example, based on a frame-by-frame image comparison, based on determining a change in a head position of driver 220, based on determining a change in eye position of driver 220, or based on any other suitable technique. In some embodiments, display system 100 may continually determine the position of driver 220. In some embodiments, the detected first position and the detected change in the first position are determining by average the detected positions of the driver over time (e.g., over 10, 20, 30, 40, 50, or 60 seconds). This way, a short change in position will not result in a modification to the display 250. If no change in position is detected, process 400 continues to 530 and no action is taken.

If a change is detected at 520, at 540 processing circuitry 104 may modify or adjust a position of at least one information element on a display based on the detected second position of driver 220. In some embodiments, the modified position is in response to determining that information element 300 is obstructed from driver 220 and as a result not sufficiently visible to driver 220. In some embodiments, the modified position of information element 300 is to a visible position on display 250. In some embodiments, another information element may be moved to a position that it is not visible to driver 220 to make room for information element 300 to be visible to the driver 220 instead.

Figure 6:
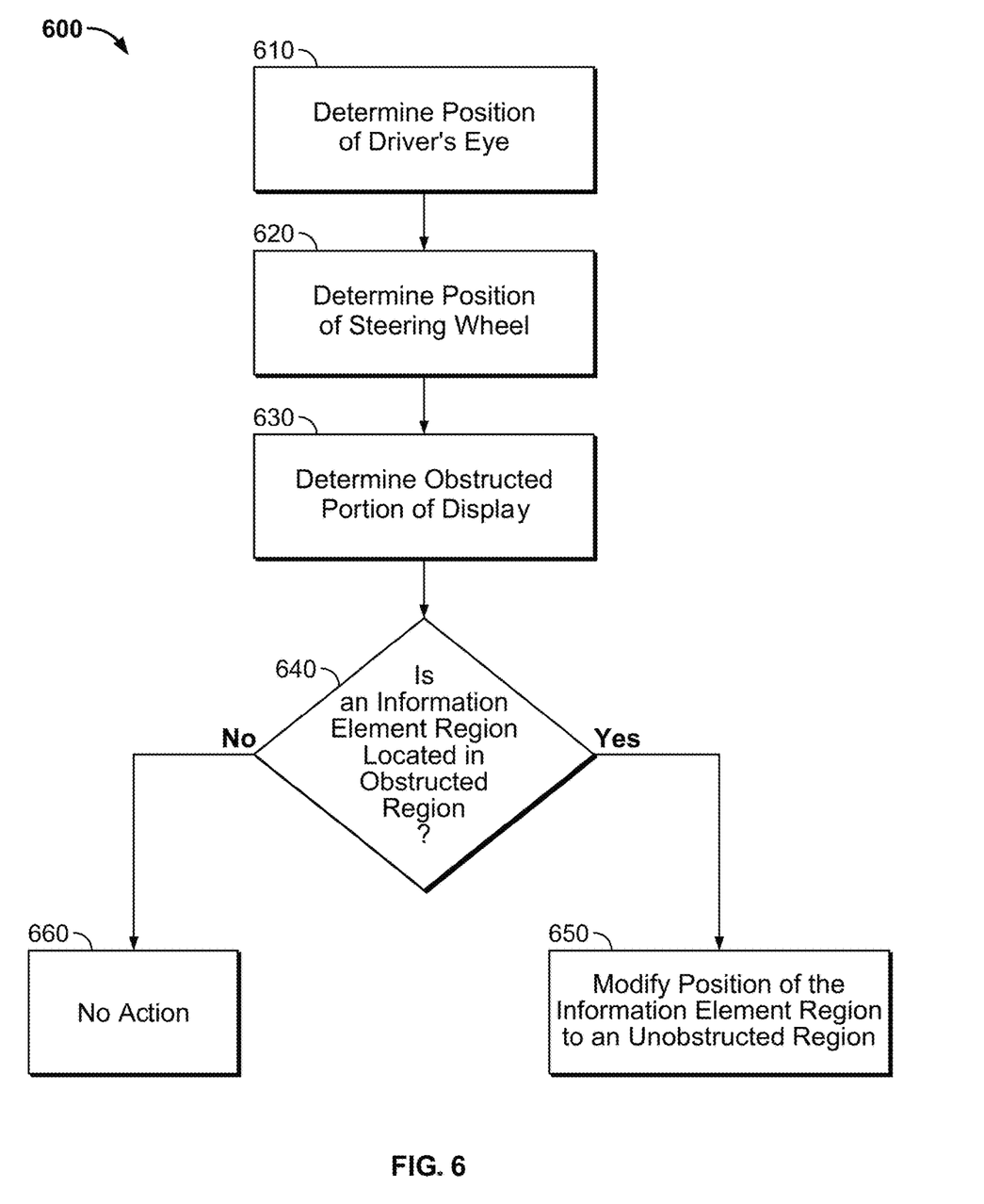
FIG. 6 shows a flowchart for a process for positioning information elements on a display, in accordance with some embodiments of the present disclosure.

FIG. 6 is an illustrative flowchart of a process 600 for positioning information elements on a display in accordance with some embodiments of the present disclosure. Process 600 may be executed by processing circuitry 104 (e.g., by processor 105 of FIG. 1). That is, processing circuitry 104 may be configured to perform process 600.

At 610, processing circuitry 104 may determine a position of driver 220's eye or eyes. The determining may be performed using camera 200 or image recognition software as described above. In some embodiments, processing circuitry 104 may determine the position of each of driver 220's eyes, one eye, or an average position of the eyes such as by determining a center point between the eyes.

At 620, processing circuitry 104 may determine the position of steering wheel 240 in the vehicle. For example, the determining may be based on information received from steering wheel position sensor 109. At 630, processing circuitry 104 may determine an obstructed portion of display 250 based on the position of the driver 220's eyes and the position of steering wheel 240. As discussed above, steering wheel 240 may obstruct a line of sight from driver 220 to display 250, obstructing the driver 220's view of one or more portions of display 250.

At 640, processing circuitry 104 may determine if an information element 300 region is located in an obstructed region. If the processing circuitry 104 determines that an information element region is located in an obstructed region, processing circuitry 104 may modify the position of the information element region to an unobstructed region to be visible to driver 220 at 650. If processing circuitry 104 determines that an information element region is not located in an obstructed region, the processing circuitry 104 may perform no action at step 660.

Figure 7:
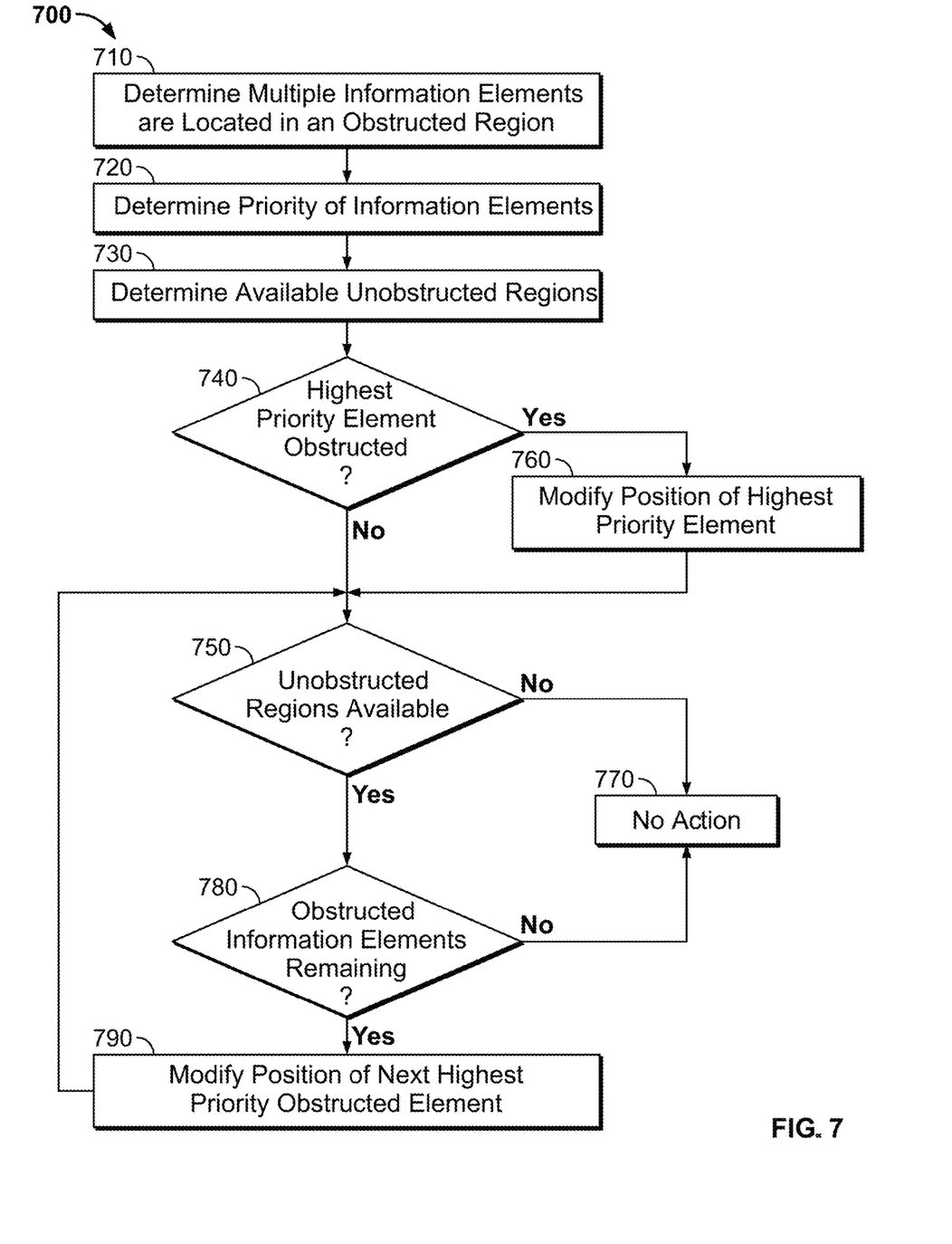
FIG. 7 shows a flowchart for a process for positioning ranked information elements on a display, in accordance with some embodiments of the present disclosure.

FIG. 7 is an illustrative flowchart of process 700 for positioning ranked information elements on a display in accordance with some embodiments of the present disclosure. Process 700 may be executed by processing circuitry 104 (e.g., by processor 105 of FIG. 1). That is, processing circuitry 104 may be configured to perform process 700.

At 710, processing circuitry 104 may determine that multiple information elements are located in an obstructed region or regions. As discussed above, for example, the determining may be based on the position of the driver 220's eyes in the vehicle and the position of steering wheel 240.

At 720, processing circuitry 104 may determine the priority rankings of the information elements. In some embodiments, the priority rankings may be determined by the manufacturer. In some embodiments, the rankings may be determined by a user or driver 220 and input through user interface 108. In some embodiments, processing circuitry 104 determines the priority rankings of information elements by comparing the information elements to a provided ranking.

At 730, processing circuitry 104 may determine one or more available unobstructed regions as described above. At 740, processing circuitry 104 may determine if the highest priority information element is obstructed as described above. If it is not, processing circuitry 104 may determine if there are remaining unobstructed regions on display 250 at 750. If the highest priority information element is obstructed, processing circuitry 104 may modify the position of the highest priority element at 760. After processing circuitry 104 has modified the position of the highest priority information element, process 700 may proceed to 750 to determine if there are remaining unobstructed regions available on display 250.

If there are no remaining unobstructed regions at 750, processing circuitry 104 performs no action at 770. If there are remaining unobstructed regions at 750, processing circuitry 104 determines at 780 if there are remaining obstructed information elements of the information elements determined to be obstructed at 710. If there are no remaining obstructed information elements, process 700 moves to 770 and processing circuitry 104 performs no action. If there are remaining obstructed information elements at 780, process 700 moves to 790 to modify the position of the next highest obstructed priority element. After modifying the position of the next highest priority information element at 790, process 700 returns to 750 to determine if there are remaining unobstructed regions. Once the process returns to step 750, steps 750-790 are repeated for any remaining obstructed information elements until there are either no remaining unobstructed regions at 750 or there are no remaining obstructed information elements at 780.

It will be understood that processes 400-700 are merely illustrative and that various changes can be made within the scope of the disclosure. For example, in some embodiments, a defined second position at 520 may be provided. In some embodiments, step 420 of determining a position of driver's eyes may include additional steps to ensure that the position of the driver's eyes is accurately determined. For example, display system 100 may consider multiple data points such as seat position and driver height to find the position of the eyes. Display system 100 may further consider use of the vehicle before modifying or adjusting the position of information elements. For example, a vehicle that is used for off roading as well as highway driving may display information elements having different content and priorities depending on the driving mode or where the vehicle is located.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following paragraphs.

What is claimed is:

1. A system for displaying information, comprising:
a display in a vehicle;
processing circuitry coupled to the display and configured to:
  detect a first position of a user in the vehicle;
  detect a change in the first position of the user to a second position of the user in the vehicle; and
  adjust a position of at least one information element on the display based on the second position of the user of the vehicle, wherein a plurality of information elements on the display are obstructed in the second position of the user, there are more obstructed information elements on the display than available unobstructed regions on the display, each available unobstructed region does not display an information element, and the available unobstructed regions comprise at least one unobstructed region, by:
selecting a highest priority obstructed information element based on a hierarchy of information elements,
moving the highest priority obstructed information element to one of the at least one unobstructed region, and
repeating the selecting and the moving operations until no available unobstructed regions remain.

2. The system of claim 1, wherein the processing circuitry is further configured to:
determine that the plurality of information elements are obstructed in the second position of the user.

3. The system of claim 1, wherein the processing circuitry is further configured to adjust the position of the at least one information element in response to input from a user.

4. The system of claim 1, further comprising:
a camera configured to capture an image of the user of the vehicle; and
a computer vision algorithm configured to detect the first position of the user by identifying a facial feature of the user in the captured image.

5. The system of claim 4, wherein the facial feature comprises the user's eyes.

6. The system of claim 1, wherein the processing circuitry is further configured to:
detect a position of the user's seat; and
detect the first position and the second position of the user based on the detected position of the user's seat.

7. The system of claim 1, wherein the processing circuitry is further configured to:
detect a position of a steering wheel in the vehicle; and
adjust the position of the at least one information element based on the position of the steering wheel and the second position of the user.

8. The system of claim 1, wherein:
the change in the first position of the user is in a first direction; and
the processing circuitry is further configured to adjust the position of the at least one information element on the display in a second direction opposite the first direction.

9. The system of claim 1, wherein:
at least one obstructed information element is not adjusted because no available unobstructed regions remain.

10. A method for displaying information, comprising:
detecting a first position of a user of a vehicle;
detecting a change in the first position of the user to a second position of the user; and
adjusting, using processing circuitry, a position of at least one information element on a display based on the second position of the user, wherein a plurality of information elements on the display are obstructed in the second position of the user, there are more obstructed information elements on the display than available unobstructed regions on the display, each available unobstructed region does not display an information element, and the available unobstructed regions comprise at least one unobstructed region, by:
selecting a highest priority obstructed information element based on a hierarchy of information elements,
moving the highest priority obstructed information element to one of the at least one unobstructed region, and
repeating the selecting and the moving operations until no available unobstructed regions remain.

11. The method of claim 10, further comprising:
determining that the plurality of information elements are obstructed in the second position of the user.

12. The method of claim 10, wherein adjusting the position of the at least one information element on the display is in response to input from a user.

13. The method of claim 10, further comprising:
capturing an image of the user of the vehicle,
wherein detecting the first position of the user comprises identifying a facial feature of the user in the captured image of the user.

14. The method of claim 13, wherein the facial feature comprises the user's eyes.

15. The method of claim 10, further comprising:
detecting a position of the user's seat,
wherein detecting the first position and the second position of the user is based on the position of the user's seat.

16. The method of claim 10, further comprising:
detecting a position of a steering wheel in the vehicle,
wherein adjusting the position of the at least one information element on the display is based on the position of the steering wheel and the second position of the user.

17. The method of claim 10, wherein:
the change in the first position of the user is in a first direction; and
adjusting the position of the at least one information element on the display comprises adjusting the position of the at least one information element in a second direction opposite the first direction.

18. The method of claim 10, further comprising:
not adjusting at least one obstructed information element because no available unobstructed regions remain.

19. A non-transitory computer-readable medium having non-transitory computer-readable instructions encoded thereon that, when executed by a processor, causes the processor to:
detect a first position of a driver of a vehicle;
detect a change in the first position of the driver to a second position of the driver; and
in response to the detected second position of the driver, adjust a position of at least one information element on a display of the vehicle, wherein a plurality of information elements on the display are obstructed in the second position of the user, there are more obstructed information elements on the display than available unobstructed regions on the display, each available unobstructed region does not display an information element, and the available unobstructed regions comprise at least one unobstructed region, by:
selecting a highest priority obstructed information element based on a hierarchy of information elements,
moving the highest priority obstructed information element to one of the at least one unobstructed region, and
repeating the selecting and the moving operations until no available unobstructed regions remain.

20. The non-transitory computer-readable medium of claim 19, wherein the instructions, when executed by the processor, further cause the processor to:

determine that the plurality of information elements are obstructed in the second position of the driver.

* * * * *